United States Patent Office 3,490,354
Patented Jan. 20, 1970

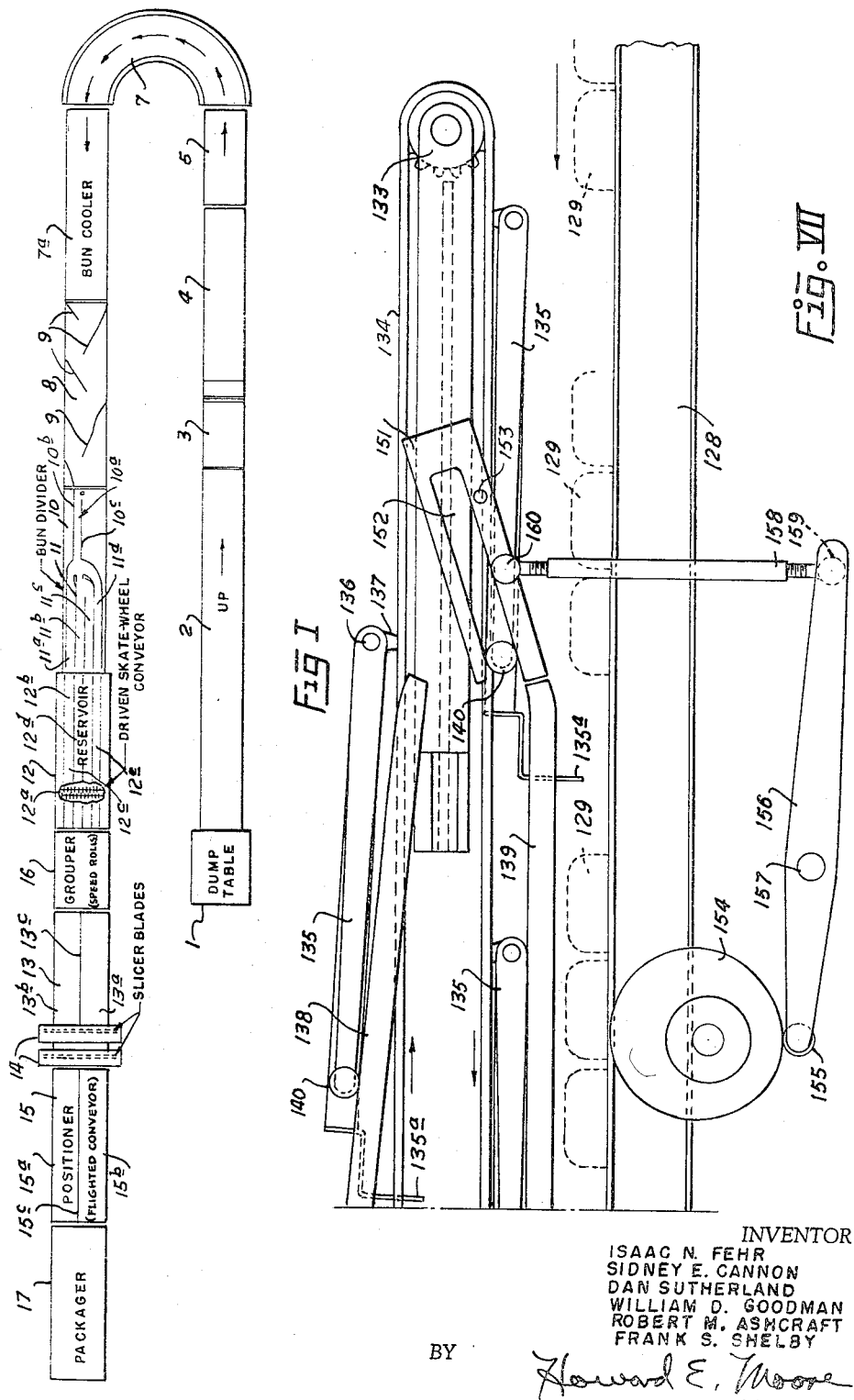

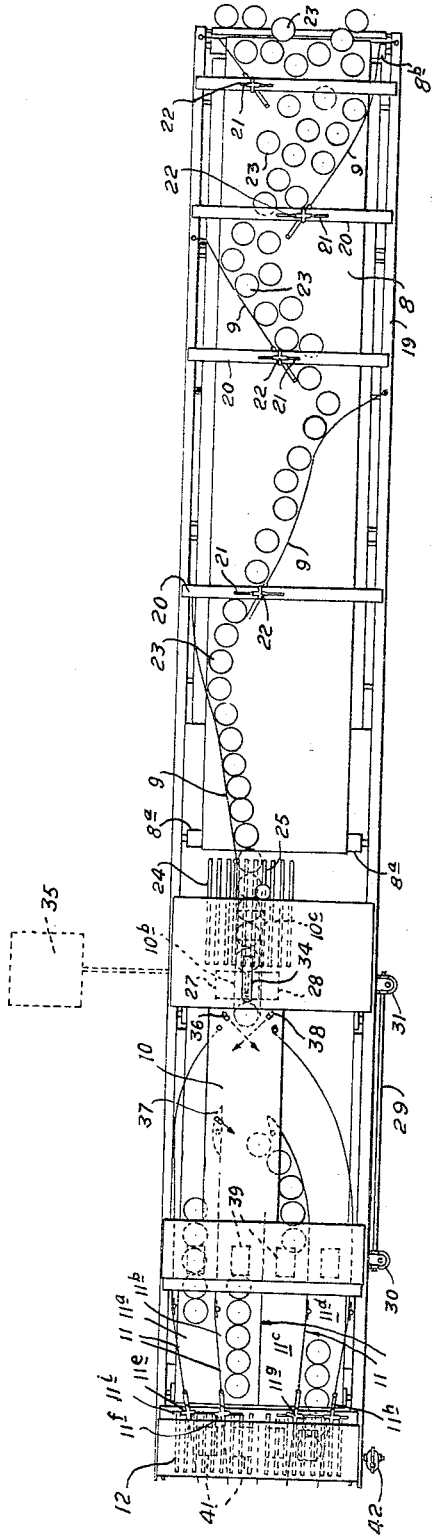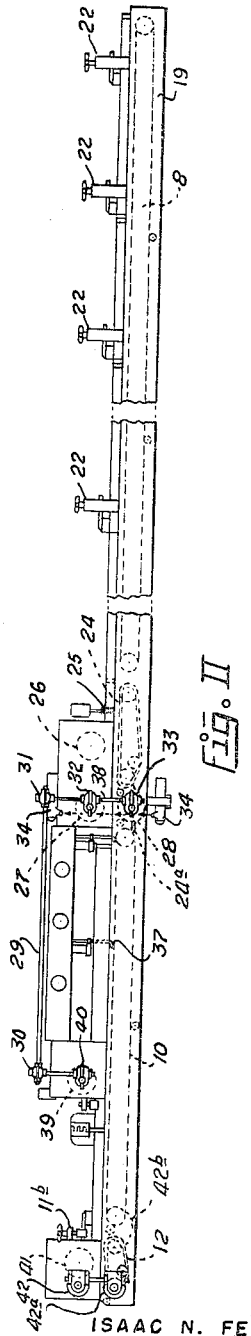

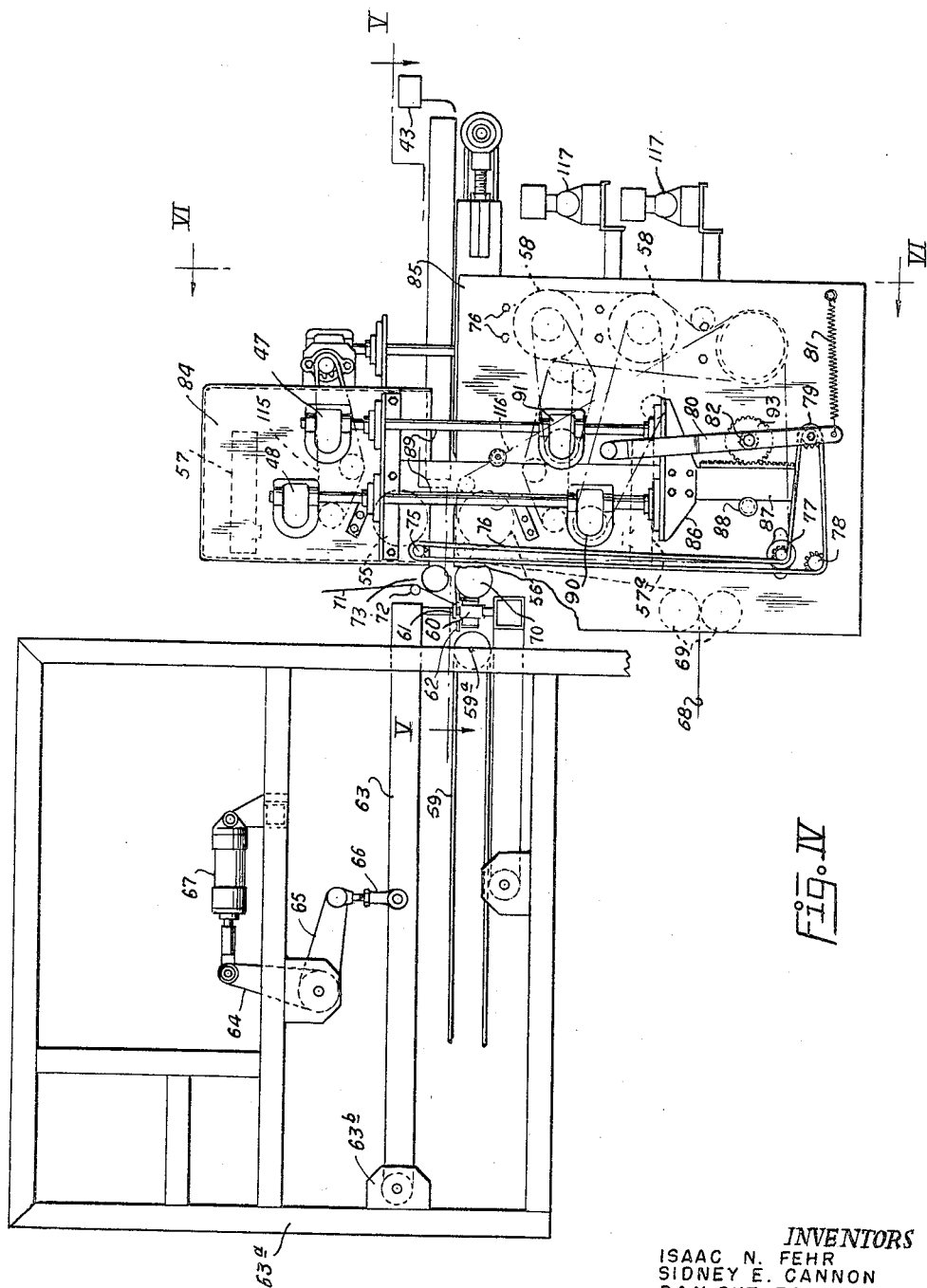
Fig. IV

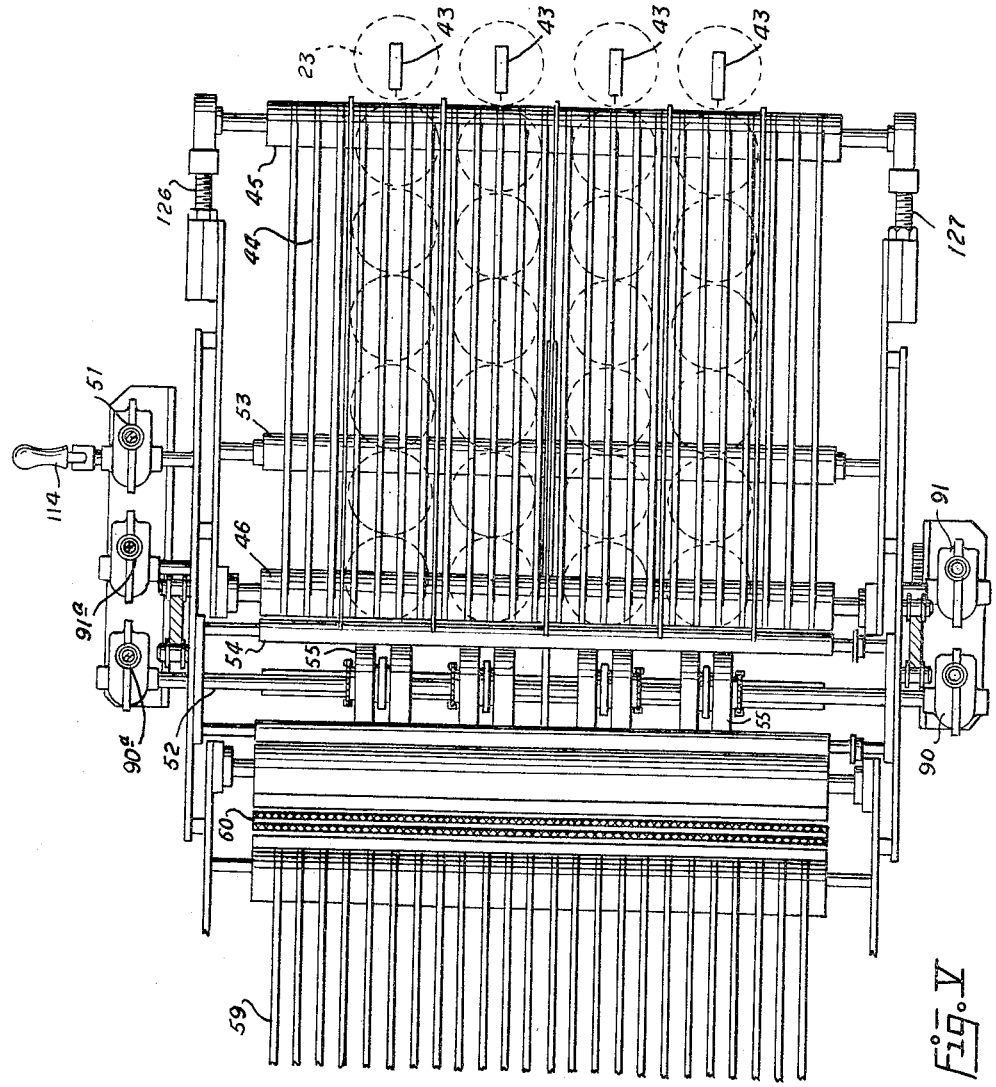

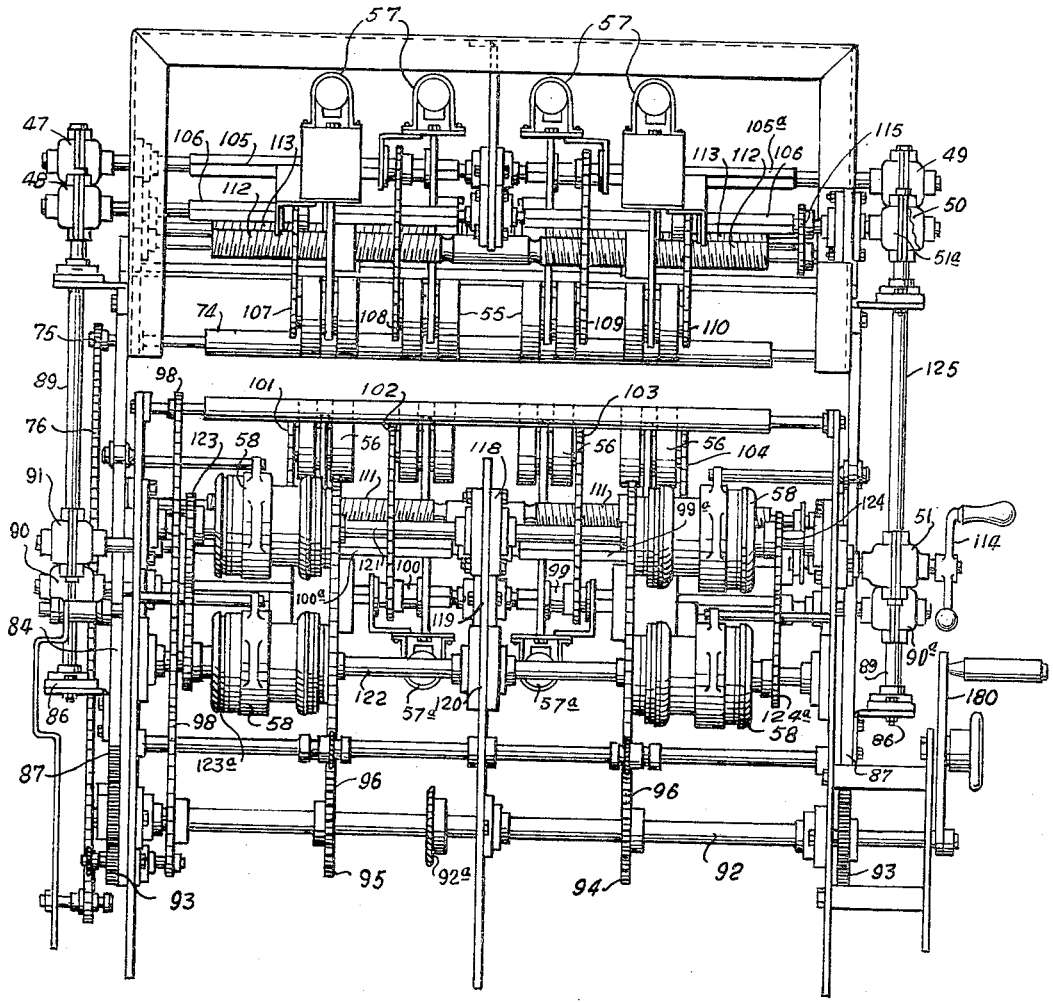
Fig. VI

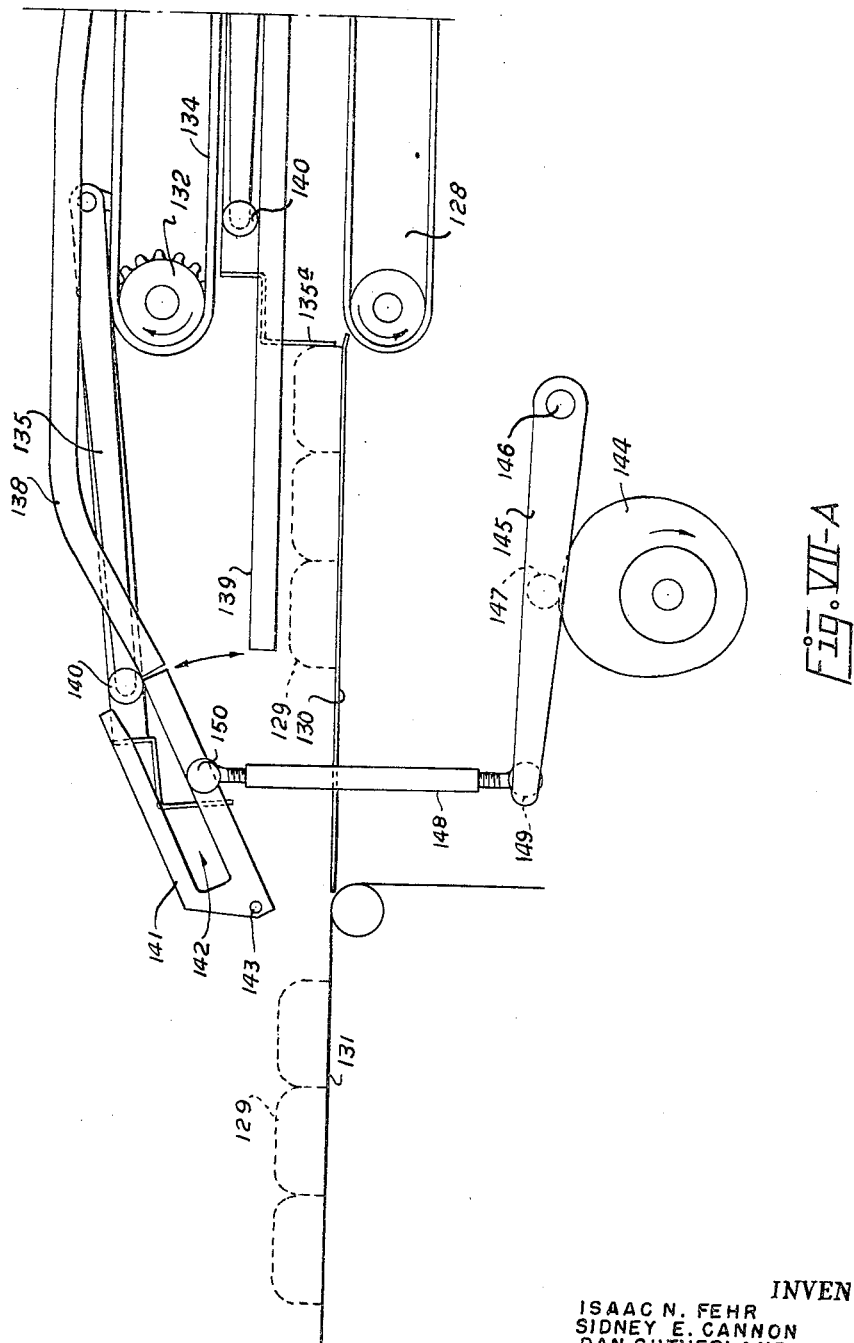

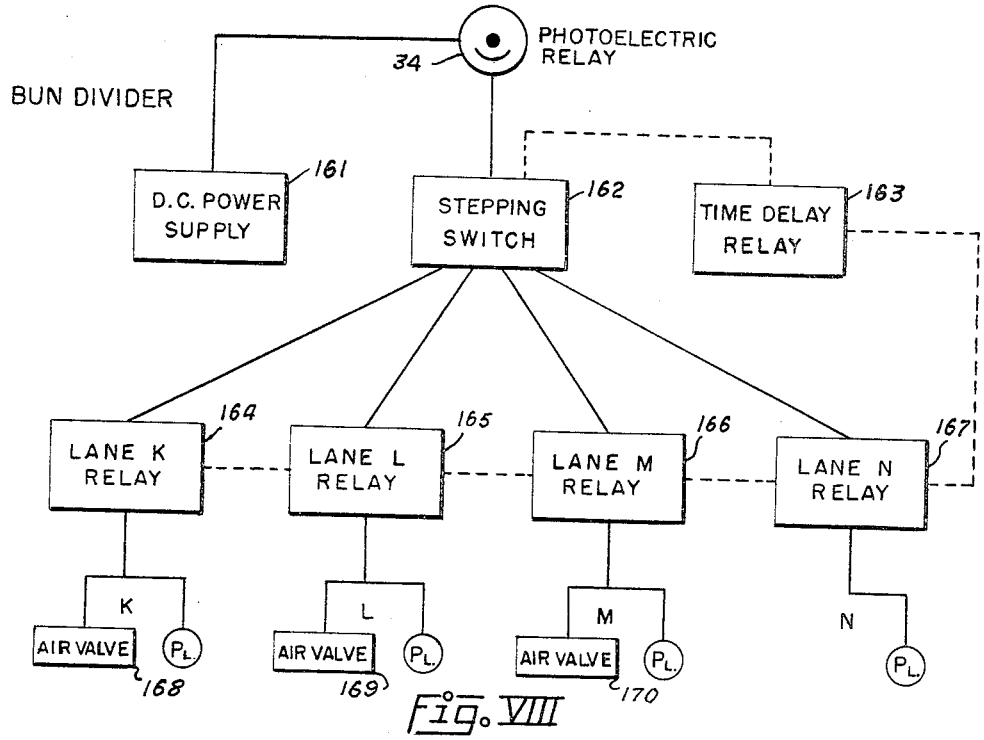
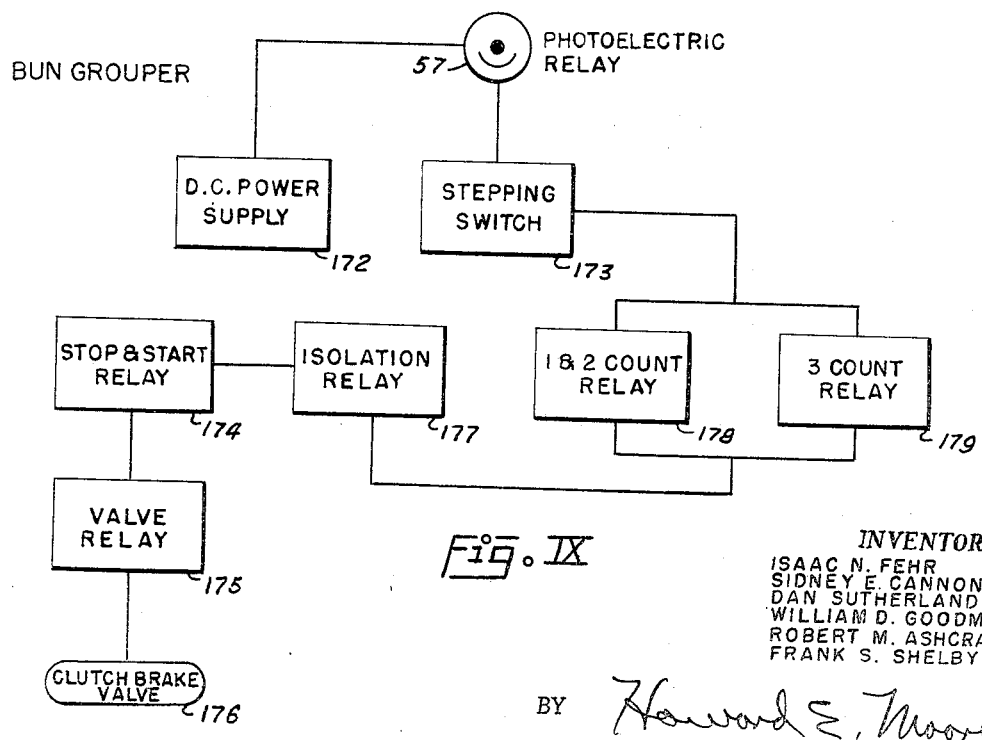

3,490,354
CONTINUOUS FLOW BUN PACKAGER
Isaac N. Fehr, Sidney E. Cannon, Dan Sutherland, William D. Goodman, Robert M. Ashcraft, and Frank S. Shelby, Dallas, Tex., assignors to Campbell Taggart Associated Bakeries, Inc., Dallas, Tex., a corporation of Delaware
Filed June 28, 1965, Ser. No. 467,628
Int. Cl. B65b 25/18
U.S. Cl. 99—173
21 Claims

ABSTRACT OF THE DISCLOSURE

Method and apparatus for packaging buns or like articles which comprises depositing buns in a random manner on a conveyor means, and while the articles are being conveyed providing means to form the articles into a single row, divide the single row of articles into a plurality of longitudinally extending parallel rows and thereafter group, slice, regroup, and package the groups of articles into separate packages.

---

The method and apparatus hereinafter disclosed provides a means for depositing buns, rolls, or other bakery and food articles at random on a conveyor where they are allowed to cool while being transported on successive conveyors to the dividing, slicing, and packaging areas. The buns or rolls pass through a series of guides which position same into a single line from which they are counted and divided into equal numbers into a plurality of separate lanes.

Such division is accomplished by successively actuated air nozzles which are arranged to direct the buns into the respective lanes as hereinafter described.

The buns are then passed along a reservoir-conveyor to a grouper device wherein the buns in the separate lanes are counted and separated into groups of equal number for packaging.

The grouped buns are then passed through a slicer where they are sliced by horizontally rotating band blades. After being sliced, a positioner device is provided for pushing the groups of buns closer together, after being displaced by the slicing operation, or otherwise, immediately before passing same to a packager wherein the groups of buns are automatically wrapped and packaged.

It is, therefore, a primary object of the invention to provide a method and apparatus for continuously cooling, dividing into separate lanes, grouping, slicing, and packaging buns, rolls, or other food articles.

Other and further objects of the invention, in addition to the foregoing, will become apparent upon reading the detailed specification hereinafter following and by referring to the drawings annexed hereto.

DESCRIPTION OF THE DRAWINGS

Suitable embodiments for carrying out the invention are shown in the attached drawings wherein, FIGURE I is a diagrammatic view of the continuous flow bun packager apparatus;

FIGURE II is a side elevational view of the bun divider area of the device;

FIGURE III is a top plan view of the bun divider area of the device;

FIGURE IV is a side elevational view of the grouper and packager area of the device;

FIGURE V is a sectionalized top plan view of the grouper area of the device taken along the line V—V of FIGURE IV;

FIGURE VI is a sectionalized and elevational view of the grouper portion of the device taken along the line VI—VI of FIGURE IV;

FIGURES VII and VII-A are a side elevational view of the positioner portion of the device;

FIGURE VIII is a block diagram of the electrical circuit for operating the bun divider area of the device;

FIGURE IX is a block diagram of the electrical circuit for operating the bun grouper portion of the device.

DESCRIPTION OF A PREFERRED EMBODIMENT

Numeral references are employed to indicate the various parts shown in the drawings and like numerals indicate like parts through the various figures of the drawings.

Referring first to FIGURE I, wherein the continuous flow bun divider, grouper, slicer, and packager is shown in diagrammatic form, the buns 23 are deposited from the oven onto a dump table 1 where they are arranged in upright position and moved therefrom onto a belt conveyor 2 and therefrom along a series of belt conveyors 3, 4, 5, 7, and 7a, which collectively may be called the random conveyor section. These conveyors move relatively slowly so that the buns may cool while being moved to the aligner area 8.

The aligner conveyor area 8, which will be described more in detail hereinafter, comprises a belt conveyor rotatable on drums 8a and 8b (FIGURE III), over which are disposed stationary guide members 9 against which the buns are moved by the conveyor belt 8 to align the buns in a single line. It will be noted that the spacing between ends of the guide members 9 is such that a single line of buns may be passed onto the belt conveyor 10 into the lane 10a provided by the side guides 10b and 10c.

A plurality of longitudinal guides 11 are disposed over the conveyor belt 10 by which the buns are consecutively divided and moved into the separate lanes 11a–11d, so as to provide a plurality of equally divided lanes of buns which are moved along a reservoir conveyor 12 in divided lanes 12b–12e. The guides 11 are made of flexible strap material which may be laterally adjustable at their free ends by adjustment posts 11e–11h which are movable laterally, in slots 11i in one of the cross braces 20. The conveyor 12 consists of a plurality of laterally aligned rotatable driven skate or ball bearing mounted wheels 12a which serve to slow up the buns in their travel before being passed through the grouper 16 where they are counted and divided into equal groups for packaging. The conveyor 12 serves as an idler or force limiting device to prevent excessive buckling of the buns as they collect ahead of the grouper.

The grouper mechanism will be described in more detail hereinafter.

After the buns have been divided into equal groups they are deposited upon a slicer conveyor 13 which is divided into two lanes 13a and 13b by a longitudinal divider 13c. The buns are usually grouped in numbers of 8 or 12 each, but the adjustment of the counting and sorting devices allow them to be grouped in any multiple of 4 that is desired.

The grouped buns are passed from the conveyor 13 through horizontally disposed rotating band blades 14 which slice the buns horizontally.

Inasmuch as the passing of the buns through the blades 14 has a tendency to slightly separate them, and because the grouper feed rolls do not always feed buns at the same instant, and for other reasons, the spacing between the buns in each group is not uniform. Therefore, it is desirable to pass them along a positioner conveyor 15 which has lanes 15a and 15b thereon, formed by the central partition 15c, corresponding to the lanes 13a and 13b on the slicer conveyor 13. While passing along the positioner conveyor 15, the individual groups of buns are pushed together by rotating pusher arms, hereinafter described, so as to uniformly position the buns relative to each other in each group whereby the automatic packager to which they are passed may operate thereon uniformly to wrap and package same.

The buns are passed from the positioner conveyor 15 into the packager 17, hereinafter described, where they are enclosed in suitable packages from whence they are removed to a storage area.

Referring now to FIGURES II and III which show the construction of the bun divider area of the device, the general frame for such area is generally indicated by the numeral 19 which is braced and supported by cross braces 20. The cross braces 20 are spaced above the conveyor belts 8 and 10.

The guide members 9 are made of flexible, metallic, strap material, the outer ends of which are secured to the side frames 19 and the inner ends thereof pass under the cross braces 20 and are attached to adjustment posts 22 which are slidably disposed in elongated slots 21 in the cross braces 20. Thereby the guide members 9 may be adjusted laterally to guide the buns 23 therebetween in sufficient numbers so that at the time the buns have reached the last guide member 9 they will be disposed in a single line.

After the buns have been arranged in a single line and passed between the guide members 10b and 10c they are passed over a conveyor consisting of a plurality of slowly moving band conveyors 24 so that they may be fed at the desired speed to the bun divider area 11. The band conveyors 24 are arranged to move at approximately ⅔ the speed of the conveyor 8.

A rotatable vertically disposed brush 25 is provided for brushing away buns which might have been collected outside of the single row so that it may be assured that only a single row of buns will pass to the divider area.

A slowing roller 26 is rotatably disposed over the row of buns 23 and is rotated at the same speed as the conveyor bands 24 so that it will engage the buns 23 successively and slow them up before being passed to the divider section. Spaced upper rollers 27 and lower rollers 28 are rotated through gear boxes 30, 31, 32, and 33 in association with an intervening shaft 29. The rollers 27 and 28 are preferably covered with a resilient rubber or plastic cover and are spaced apart so as to lightly, grippingly engage the successive buns 23 as they pass on the conveyor 24 therebetween. The rollers thereby engage each individual bun and move it away from the bun immediately therebehind into the path of the light beams between the photoelectric cells 34 and light source 34a.

The successive buns passing in front of the photoelectric cell 34 indexes a stepping switch, hereinafter described, which successively operates the air nozzles 36, 37, and 38 so as to allow a predetermined number of buns, which in this instance, would be five, to pass straight through into the lane 11b. The air nozzle 38 is then energized for sufficient time to blow five buns successively into the lane 11a. The air nozzle 36 is then energized to blow five buns successively into lane 11d, and then air nozzle 37 is energized to blow five buns successively into lane 11c. This sequence is continuously repeated. Thereby the buns are equally divided between the lanes.

A control panel 35 is provided for setting the various electric and electronic components of the device.

Rotatable rollers 39 are rotatable through a gear box 40 and engage the buns on the conveyor 10 to slow them up. Another set of resilient rollers 41 are rotatable through a gear box 42, driven through a gear box 42a, to further slow up the buns in their movement.

Referring now to FIGURES IV, V, and VI, the buns 23, after being so divided into equal lines, are passed to the grouper section 16 where they are counted and divided into desired groups for packaging.

A plurality of bun actuated switches 43 are provided, there being one positioned over each lane of buns 23, so that the switches are energized by engagement with the buns. The switches are in series with the power for the operation of the bun grouper so that it is necessary that a bun 23 be positioned against each switch, so that all switches are closed, before power is supplied to the bun grouper mechanism, thereby assuring that the row of buns in each lane shall have moved to a position to be counted into groups by the grouper mechanism before the grouper mechanism is energized.

A conveyor consisting of parallel bands 44 (FIGURE V) is rotatably disposed about the spaced rollers 45 and 46. Photoelectric cells 57 are provided above and below each lane of buns which are energized by the buns passing between the light sources 57a and the cells 57 on the conveyor 44.

The buns are passed individually between the resilient upper feed rollers 55 and resilient lower feed rollers 56. As the buns are passed between the feed rollers 55 and 56 the buns are counted by the photo-electric cells 57 until the desired number is counted out for a package which may be four buns, eight buns, or twelve buns, depending upon the setting. When the predetermined number of buns have passed the rollers stop, thereby providing a space between the group of buns and the next successive group. The cycle is then repeated as will be hereinafter explained in connection with the diagrammatic electric circuit.

Each set of resilient feed rollers 55 and 56 are independent of the other three sets. A set consists of an upper roller 55 and a lower roller 56.

Torque is supplied to each of four air operated clutch brakes 58 by one of two chain drives 96 from the input power shaft 92, which is driven through the sprocket 92a.

Upper feed rollers 55 are driven by chains 107, 108, 109, 110 from independently driven upper horizontal shafts 106, 106a, 105a, and 105, and the lower feed rollers 56 are driven through chains 101, 102, 103, 104 from independent lower horizontal shafts 100a, 100, 99, 99a.

The horizontal shafts 106, 100a; 105, 100; 105a, 99; and 106a, 99a; are connected by vertical shafts 89 through right angle gear boxes 48, 91; 47, 90; 49, 90a; 50, 91a. Gear box 50 is directly behind gear box 51a in FIGURE VI.

The lower horizontal shafts 100a, 100, 99, and 99a are driven through chains 123, 123a, 124a, and 124 from the output of clutch brakes 58.

The four sets of feed rollers 55, 56 are started to rotate by an electrical impulse from the control panel 35 to each of the four solenoid operated air valves 117, which release the air operated clutch brakes 58 and energize the clutches therein to thereby rotate the rollers through the drive chains 123, 123a, 124a and 124. Each set of feed rollers 55 and 56 run until the pre-selected number of buns have been counted through the particular lane, when the air valves 117 are de-energized to disengage the clutches in the clutch brakes 58.

Means is provided for adjusting the vertical pressure, as well as the lateral pressure relationship between the rollers 55 and 56 so that they may be laterally aligned and the pressure exerted against the buns passing therebetween may be regulated.

Lateral adjustment may be accomplished through rotation of the crank arm 114 which through the gear boxes 51, shaft 125 and gear box 51a will rotate the feed screws 113 and 112 to move the rollers 55, mounted on appropriate brackets carried by the feed screws, laterally with reference to the frame.

The lower feed screws 111 are rotated in unison with the upper feed screws 112 and 113 by rotation of the handle 114 to thereby move the lower rollers 56 laterally on appropriate mounts attached to the feed screws 111.

The upper and lower feed screws 111 and 113 are rotated through appropriate drive chains 115 and 116.

Vertical adjustment between the rollers 55 and 56 may be accomplished by rotating the crank arm 180 which causes gears 93 to move up or down the racks 87 (FIGURE IV), thereby causing the frame 86 to move upwardly to allow the rods 89 to slide upwardly through the gear boxes 90 and 91, and 90a and 91a to move the frame 84 upwardly carrying with it the rollers 55 in either up or down position to adjust the pressure relationship between the rollers 55 and 56.

The drive chain 76 about the idler sprockets 78 and 79 and drive sprocket 77 and driven sprocket 75 for guide roller 74 is retained in taut position during such adjustment, and after such adjustment by a spring 81, which is attached between frame 85 and pivoted arm 80 to resiliently urge pivoted arm 80 outwardly to compensate for the vertical movement between the upper frame 84 and the lower frame 85.

As shown in FIGURE IV the grouped buns are fed directly into the wrapper-packager unit 17. However, it will be understood that the groups of buns may be fed through a slicer unit 14 and through the positioner unit 15 before being fed to the packaging unit, as shown in FIGURE I.

FIGURE IV is illustrative of a suitable packaging device. As shown, a sealer bar 60 is provided which has a knurled or roughened surface on the upper side thereof. A back-up plate 61, having a resilient surface thereon, is attached to the outer end of the pivoted arm 63, which is pivoted to the frame 63a at 63b. The arm 63 may be reciprocated up and down by a pneumatic cylinder 67 through the pivoted arms 64 and 65 and a pivoted link 66, attached to said arm 63.

A lower web of polyethylene packaging paper 68 is fed between the guide rollers 69 and about the guide roller 70 and over the surface of the sealer bar 60.

An upper web of polyethylene wrapping paper 71 is fed about a guide roller 72 and over the sealer bar 60.

The sealer bar 60 has a heater element therein and when the resilient back-up plate 61 is brought downwardly against the webs 71 and 68 disposed therebetween, the paper webs are pressed together by the knurled surface on the sealer bar and are fused together by the heat thereof, thus providing a seal.

The stripper bar 62, which is preferably surfaced with resilient material, has an upper surface which is positioned above the sealer bar 60 so that after the back-up plate 61 is raised away from the joined sealed surfaces of the edges of the webs 71 and 68, the movement of the wrapping paper by the buns moving thereagainst will strip the paper away from the sealer bar 60.

The groups of buns are fed between the guide roller 70 and the pressure roller 73 outwardly with enough force to pull the paper webs 71 and 68 forwardly.

The actuation of the air cylinder 67 is timed so that as the group of buns with wrapping paper thereabout moves a sufficient distance on the conveyor 58 to bring the space between the next following group of buns over the sealer bar 60, the back-up plate 61 will be brought downwardly in pressure relationship against the sealer bar 60, thereby pressing and sealing the webs 71 and 68 together to provide a sealed package. This process is continued as successive groups of buns are packaged.

At an appropriate place (not shown) the packages of buns are cut apart as by a reciprocating cutter blade, or otherwise, and removed to an appropriate storage area.

Referring to FIGURES VII and VII-A the positioner for pushing the individual buns in the groups of buns together prior to packaging, if desired, is shown.

In such figures, a belt conveyor 128 conveys the groups of buns 129 along the tracks 15a and 15b, and such groups of buns may be deposited upon a stationary plate 130 where the pusher arms 135 engage same and move them along the surface of the stationary plate 130 onto the take-off conveyor 131.

A pusher arm conveyor chain 134 is disposed about the spaced sprockets 132 and 133, which are rotatable.

A plurality of pusher arms 135 have their inner ends pivotally attached to the chain 134 by means of pivot pins 136 pivotally attached to lugs 137 on the inner side of the spaced chains 134.

It will be understood that when viewed from above, the parts shown in elevation in FIGURES VII and VII-A are duplicated in spaced relationship on each side of the conveyor 128.

Upper cam tracks 138 and lower cam tracks 139 are arranged to rotatably receive the rollers 140 attached to the outer ends of the pusher arms 135.

Raising ramps 141 have slots 142 therein and are pivotally attached to the frame for the device at 143 so that they may pivot up and down about the pivot points 143.

Cams 144 are arranged to rotatably engage the cam followers 147 attached to the arms 145, which are pivoted at 146.

Pusher arms 148 are pivotally attached at 149 to the outer ends of the arms 145 and each has an upper end 150 which contacts the raising ramps 141.

It will be seen that by rotation of the cams 144 the raising ramps 141 may be caused to move up and down in the direction of the arrow for the purpose hereinafter mentioned.

Lowering ramps 151 have slots 152 therein and are pivoted at 153.

Cams 154 engage cam followers 155 on the outer ends of the arms 156, which are pivoted at 157. Pusher arms 158 are pivotally attached at 159 to the outer ends of the arms 156, and are pivotally attached at their upper ends at 160 to the lowering ramps 151. Thus, it will be seen that the lowering ramps 151 may be raised and lowered by rotation of the cams 154.

The outer ends of pusher arms 135 are joined by vertically disposed ends 135a thereon which are arranged to engage and push the groups of buns 129 along the stationary plate 130, as illustrated in FIGURE VII-A.

The pusher arms 135 are carried with the chains 134 about the sprockets 132.

The operation of the grouper mechanism is as follows:

Beginning with the upper pusher arm 135 in FIGURE VII, it will be seen that the rollers 140 thereon are rolling along the upper ramps 138 as the rotating chains 130 move therealong. The cams 154 are so timed that as the rollers 140 reach the ends of the ramps 138 the slots 152 in the lowering ramps 151 are in raised position and in alignment with the upper ramps 138 so that the rollers 140 will enter the slots 152. As the cams 154 continue to rotate, the ramps 151 will be pivoted downwardly to the position shown in FIGURE VII so that the slots 152 are in alignment with the lower tracks 139. The rollers 140 will then roll along the lower ramps 139 as the chains 134 continue to rotate. As the rollers 140 reach the end of the track 139, the cams 144 will have rotated to a position to lower the ramps 141 about the pivot points 143 to bring the slots 142 into alignment with the rollers 140 to allow the rollers to move into said slots 142. As the cams 144 continue to rotate the ramps 141 will be raised to a point where the slots 142 will be in alignment with the upper tracks 138, and as the chains 134 continue to rotate the rollers 140 will move onto the upper tracks 138. Thus, the arms 135 continue to move about. As the downwardly turned ends 135a of the pusher arms 135 are brought downwardly, as shown in FIGURE VII, they contact successive groups of buns 129 and push them along the stationary plate 130, thereby pushing the individual buns in each group together before they are moved into the packager unit 17.

The electrical circuits for operating the bun divider section 11 and the bun grouper section 16 are shown in FIGURES VIII and IX. A DC power supply 161 is provided for supplying power to the photoelectric relay, which is energized by buns passing thereunder, energizes a stepping switch 162 and a time delay relay 163. The stepping switch alternately actuates the lane relays 164, 165, 166 and 167 for separating the buns into the lanes 11a–11d by the air valves 168, 169, and 170. It will be noted that the lane relay 167, which controls the passage of buns to the lane 11b, is not connected to an air valve so that the buns can pass straight through.

The time delay relay actuates the lane relays to close the air valve associated therewith in approximately 2½ seconds after the last bun counted thereby has passed under the electric eye 34.

The bun grouper circuit, shown in FIGURE IX, also includes a DC power supply 172 which supplies power to the photoelectric relay 57. When the photoelectric relay 57 is energized, there being one for each line in the grouper, the stepping switch 173 is energized which energizes the one and two count relay 178 and the three count relay 179 which counts the buns out in the sequence desired as may be set on the control panel.

The isolation relay 177 actuates the stop and start relay 174 for the valve relay 175, which operates the clutch brake valve 176 to stop and start the feed rollers 56 at the beginning and end of each count so that there will be no lag between the counting sequence and the roller operation.

It is believed that the operation and function of the continuous flow bun packager is apparent from the foregoing description and no further elaboration on the operation and function thereon is necessary.

Having described our invention we claim:

1. In a device for packaging buns or the like, a random conveyor section arranged to receive buns; conveyor means arranged to receive the buns from the random conveyor section having means thereon adapted to arrange the buns into a single longitudinally extending row; conveyor means arranged to receive the single row of buns in sequence and having means thereon adapted to divide the buns into a multiplicity of evenly divided longitudinally extending parallel rows; conveyor means arranged to receive the evenly divided rows of buns including means adapted to arrange the buns into separated groups of equal numbers; conveyor means arranged to receive the separated groups of buns and having means thereon adapted to slice the buns; conveyor means arranged to receive the sliced buns and having means associated therewith adapted to push the buns in each group into abutting relationship after being sliced; conveyor means arranged to receive the groups of sliced buns and having means associated therewith adapted to package the groups of buns into separate packages; and means associated with each said conveyor means for maintaining the longitudinally extending parallel relationship of the row of buns.

2. The combination called for in claim 1 wherein the means to divide the buns into a single row comprises a plurality of longitudinal guides arranged to engage the buns as they move along to guide them into a single row.

3. The combination called for in claim 1 wherein the means to slice the buns comprises a horizontally rotatable band blade disposed above the conveyor.

4. The combination called for in claim 1 wherein the means to push the buns in each group into abutting relationship comprises a plurality of pusher arms rotatable longitudinally over the conveyor arranged to engage the groups of buns and push them along a stationary plate.

5. The combination called for in claim 1 wherein the means to package the groups of buns comprises a sealer bar, a presser bar disposed above the sealer bar; a pair of sheets of packaging material movable between the sealer bar and presser bar; and means to reciprocate the presser bar up and down to periodically press the sheets of packaging material together to seal the material between successive groups of buns.

6. The combination called for in calim 5 with the addition of means to move the sealed portions of the sheets vertically away from the sealer bar when the presser bar moves away from same.

7. A method of packaging substantially uniformly shaped articles comprising the following steps: depositing the articles on a conveyor; arranging the articles into a single longitudinally extending row as they are conveyed; arranging the articles into a plurality of evenly divided longitudinally extending parallel rows as they are conveyed; arranging the articles into groups of equal numbers as they are conveyed; slicing the articles as they are conveyed; pushing the articles in each group into abutting relationship as they are conveyed; maintaining the articles in evenly divided longitudinally extending parallel rows as they are conveyed; and packaging the groups of articles successively as they are conveyed.

8. A method of packaging substantially uniformly shaped articles comprising the following steps: depositing the articles on a conveyor; arranging the articles into a single row as they are conveyed; arranging the articles into a plurality of evenly divided longitudinally extending parallel rows as they are conveyed; arranging the articles into groups of equal numbers as they are conveyed; maintaining the articles in evenly divided longitudinally extending parallel rows as they are conveyed; successively moving the groups of articles between continuous sheets of packaging film; and pressing the sheets of packaging film together into adhering relationship between the groups of articles as they move.

9. The method called for in claim 8 with the addition of the step of slicing the articles as they are conveyed prior to passing the groups between the packaging film.

10. The method called for in claim 9 with the addition of the step of pushing the groups of articles into abutting relationship after slicing same.

11. The method called for in claim 8 with the addition of the step of severing the adhering surfaces of the packaging film transversely thereof to divide the groups into separate packages.

12. A device for packaging substantially uniformly shaped articles comprising, a random conveyor section arranged to receive the articles; conveyor means arranged to receive the articles from the random conveyor section and having means thereon adapted to arrange the articles into a single longitudinally extending row; conveyor means arranged to receive the single row of articles in sequence having means thereon adapted to arrange the articles into a multiplicity of evenly divided longitudinally extending parallel rows; conveyor means arranged to receive the evenly divided rows of articles and having means associated therewith adapted to arrange the articles into separated groups of equal numbers; conveyor means arranged to receive the separated groups of articles and having means associated therewith adapted to push the articles in each group into abutting relationship; conveyor means arranged to receive the groups of articles and having means associated therewith adapted to package the groups of articles into separate packages; and means associated with each said conveyor means for maintaining the longitudinally extending parallel relationship of the articles.

13. The combination called for in claim 12 wherein the means to divide the articles into a single row comprises a plurality of longitudinal guides arranged to engage the articles as they move along to guide them into a single row.

14. The combination called for in claim 12 wherein the articles are buns and with the addition of the horizontally rotatable band blade disposed above the conveyor to slice the separated groups of buns prior to packaging same.

15. A method of packaging substantially uniformly shaped articles comprising the following steps: depositing the articles on a conveyor; arranging the articles into a single longitudinally extending row as they are conveyed; arranging the articles into a plurality of evenly divided longitudinally extending parallel rows as they are conveyed; arranging the articles into groups of equal numbers as they are conveyed; pushing the articles in each group into abutting relationship as they are conveyed; maintaining the articles in evenly divided longitudinally extending parallel rows as they are conveyed; and packaging the groups of articles successively as they are conveyed.

16. In a device for packaging buns or the like, a random conveyor section arranged to receive buns; conveyor means arranged to receive the buns from the random conveyor section having means thereon adapted to arrange the buns into a single longitudinally extending row; conveyor means arranged to receive the single row of buns in sequence and having means thereon adapted to divide the buns into a multiplicity of evenly divided longitudinally extending parallel rows, said means comprising, a plurality of lanes, a plurality of air nozzles arranged to blow single buns into the lanes, and means to successively actuate the air nozzles to alternately blow a pre-selected number of buns into the separate lanes; conveyor means arranged to receive the evenly divided rows of buns including means adapted to arrange the buns into separated groups of equal numbers; conveyor means arranged to receive the separated groups of buns and having means thereon adapted to slice the buns; conveyor means arranged to receive the sliced buns and having means associated therewith adapted to push the buns in each group into abutting relationship after being sliced; conveyor means arranged to receive the groups of sliced buns and having means associated therewith adapted to package the groups of buns into separate packages; and means associated with each said conveyor means for maintaining the longitudinally extending parallel relationship of the rows of buns.

17. In a device for packaging buns or the like, a random conveyor section arranged to receive buns; conveyor means arranged to receive the buns from the random conveyor section having means thereon adapted to arrange the buns into a single longitudinally extending row; conveyor means arranged to receive the single row of buns in sequence and having means thereon adapted to divide the buns into a multiplicity of evenly divided longitudinally extending parallel rows; conveyor means arranged to receive the evenly divided rows of buns including means adapted to arrange the buns into separated groups of equal numbers, said means comprising spaced upper and lower rollers engageable with the buns in the rows, and means actuated by the buns to rotate the rollers a pre-selected period of time until a pre-selected number of buns have passed between the rollers; conveyor means arranged to receive the separated groups of buns and having means thereon adapted to slice the buns; conveyor means arranged to receive the sliced buns and having means associated therewith adapted to push the buns in each group into abutting relationship after being sliced; conveyor means arranged to receive the groups of sliced buns and having means associated therewith adapted to package the groups of buns into separate packages; and means associated with each said conveyor means for maintaining the longitudinally extending parallel relationship of the rows of buns.

18. The combination called for in claim 17 with the addition of means to maintain the roller rotating means in inactive condition until buns are in position in all lanes to be engaged by said rollers.

19. A device for packaging substantially uniformly shaped articles comprising, a random conveyor section arranged to receive the articles; conveyor means arranged to receive the articles from the random conveyor section and having means thereon adapted to arrange the articles into a single longitudinally extending row; conveyor means arranged to receive the single row of articles in sequence having means thereon adapted to arrange the articles into a multiplicity of evenly divided longitudinally extending parallel rows, said means comprising a plurality of lanes, a plurality of air nozzles arranged to blow single articles into the lanes, and means to successively actuate the air nozzles to alternately blow a pre-selected number of articles into the separable lanes; conveyor means arranged to receive the evenly divided rows of articles and having means associated therewith adapted to arrange the articles into separated groups of equal numbers; conveyor means arranged to receive the separated groups of articles and having means associated therewith adapted to push the articles in each group into abutting relationship; conveyor means arranged to receive the groups of articles and having means associated therewith adapted to package the groups of articles into separate packages; and means associated with each said conveyor means for maintaining the longitudinally extending parallel relationship of the articles.

20. A device for packaging substantially uniformly shaped articles comprising, a random conveyor section arranged to receive the articles; conveyor means arranged to receive the articles from the random conveyor section and having means thereon adapted to arrange the articles into a single longitudinally extending row; conveyor means arranged to receive the single row of articles in sequence having means thereon adapted to arrange the articles into a multiplicity of evenly divided longitudinally extending parallel rows; conveyor means arranged to receive the evenly divided rows of articles and having means associated therewith adapted to arrange the articles into separated groups of equal numbers, said means comprising spaced upper and lower rollers engageable with the articles in the rows, and means actuated by the articles to rotate the rollers a pre-selected period of time until the pre-selected number of articles have passed between the rollers; conveyor means arranged to receive the separated groups of articles and having means associated therewith adapted to push the articles in each group into abutting relationship; conveyor means arranged to receive the groups of articles and having means associated therewith adapted to package the groups of articles into separate packages; and means associated with each said conveyor means for maintaining the longitudinally extending parallel relationship of the articles.

21. The combination called for in claim 20 with the addition of means to maintain the roller rotating means in inactive condition until articles are in position in all rows to be engaged by said rollers.

References Cited

UNITED STATES PATENTS

| 2,549,122 | 4/1951 | Osterhof | 53—28 X |
| 3,000,744 | 9/1961 | Lingelbach | 99—172 |
| 3,071,236 | 1/1963 | Hahn et al. | 198—32 |
| 3,106,048 | 10/1963 | Marasso et al. | 53—123 |
| 3,127,273 | 3/1964 | Monahan | 99—173 X |
| 3,132,028 | 5/1964 | Austin et al. | 99—173 X |

A. LOUIS MONACELL, Primary Examiner

W. BOVEE, Assistant Examiner

U.S. Cl. X.R.

53—123